United States Patent [19]
Kronfli et al.

[11] Patent Number: 5,900,183
[45] Date of Patent: May 4, 1999

[54] POLYMER ELECTROLYTE

[75] Inventors: Esam Kronfli, Swindon; Christine Ruth Jarvis, Tewkesbury, both of United Kingdom

[73] Assignee: Aea Technology PLC, Didcot, United Kingdom

[21] Appl. No.: 08/787,167

[22] Filed: Jan. 23, 1997

[30] Foreign Application Priority Data

Jan. 31, 1996 [GB] United Kingdom ............... 9601890
Sep. 6, 1996 [GB] United Kingdom ............... 9618695

[51] Int. Cl.$^6$ .................................................. H01M 10/40
[52] U.S. Cl. ................... 252/62.2; 429/192; 429/190; 429/194; 429/197; 429/198; 429/199
[58] Field of Search ................. 252/62.2; 429/192, 429/190, 194, 197, 198, 199

[56] References Cited

U.S. PATENT DOCUMENTS

| | | | |
|---|---|---|---|
| 5,011,751 | 4/1991 | Yoneyama et al. | 429/192 |
| 5,429,891 | 7/1995 | Gozdz | 429/192 |
| 5,571,634 | 11/1996 | Gozdz | 429/192 |

FOREIGN PATENT DOCUMENTS

| | | |
|---|---|---|
| 0626396 | 11/1994 | European Pat. Off. . |
| 0730316 | 9/1996 | European Pat. Off. . |
| 59-91674 | 5/1984 | Japan . |
| 59-196577 | 11/1984 | Japan . |
| 3-59058 | 3/1991 | Japan . |
| WO 96/27908 | 9/1996 | WIPO . |

OTHER PUBLICATIONS

D.W. Van Krevelen et al, "Properties of Polymers" 1976, Elsevier Scientific Publishing Company, Amsterdam–Oxford–New York, pp. 487–488. (Month Unknown).

Joseph C. Salamone, Polymeric Materials Encyclopedia, 1996, CRC Press, Boca Raton, New York, London, Tokyo, pp. 7128–7133. (Month Unknown).

Kirk–Othmer, Encyclopedia of Chemical Technology, Fourth Edition, vol. 11, John Wiley & Sons, New York, Chichester, Brisbane, Toronto, Singapore, pp. 694–700. (Date Unknown).

F. Croce et al, "Impedance and lithium–7 NMR Studies of Polymer Electrolytes Based on Poly(vinylidene fluoride)," Solid State Ionics, vol. 86–8, No. 1, 1996, pp. 307–312. (Month Unknown).

Nagatomo et al, "Polyacetylene Battery with Polymeric Solid Electrolyte," Japanese Journal of Applied Physics, vol. 24, No. 6, Jun., 1985, pp. L397–L398.

Nagatomo et al, "All–Plastic Batteries with Polyacetylene Electrodes," J. Electrochem. Soc., vol. 134, No. 2, 1987, pp. 305–308. (Month Unknown).

Tsuchida et al, "Conduction of Lithium Ions in Polyvinylidene Fluoride and Its Derivatives—I," Electrochimica Acta, vol. 28, No. 5, 1983, pp. 591–595. (Month Unknown).

Tsunemi et al, "A Mechanism of Ionic Conduction of Poly (Vinylidene Fluoride)—Lithium Perchlorate Hybrid Films," Electrochima Acta, vol. 28, No. 6 (1983), pp. 833–837. (Month Unknown).

Data sheet captioned "MFR of KF Polymer" provided by Kureha Chemical Industry Co., Ltd., Performance Resins Department, Tokyo, Japan. (Date Unknown).

Data sheet captioned "MFR of PVDF [g/10 m in] Comparison of different PVDF" provided by Kureha Chemical Industry Co., Ltd., Performance Resins Department, Tokyo, Japan. (Date Unknown).

"Solef" —Main properties of Standard Grades from Solvay Ltd. Oct. 1993.

ChemAbs abstract No. 101:119363, May 1984.

Chem Abs abstract of No. 102:211577, Nov. 1984.

*Primary Examiner*—Alan Diamond
*Attorney, Agent, or Firm*—William H. Holt

[57] ABSTRACT

A polymer electrolyte suitable for use in a lithium ion cell comprises polyvinylidene fluoride (PVdF) combined with a solution of a salt such as lithium perchlorate, in a compatible solvent such as an ethylene carbonate/N-methyl-pyrrolidone mixture. The PVdF is a homopolymer of high molecular weight, with a melt flow index at 230° C. and 10 kg of less than 1.0 g/10 min.

11 Claims, 1 Drawing Sheet

POLYMER ELECTROLYTE

This invention relates to a polymer electrolyte for use in electrochemical cells and to an electrochemical cell incorporating this electrolyte.

For many years it has been known to make rechargeable cells with lithium metal anodes and cathodes of a material into which lithium ions can be intercalated or inserted. Such cells may use a separator such as filter paper or polypropylene saturated with, as electrolyte, a solution of a lithium salt (e.g. lithium perchlorate) in an organic liquid such as propylene carbonate. Alternatively they may use a solid-state ion-conducting polymer, for example a complex of a lithium salt with poly(ethylene oxide). A wide variety of intercalation or insertion materials are known as cathode materials, such as $TiS_2$, $V_6O_{13}$ and $Li_xCoO_2$ where x is less than 1; and these materials are often mixed with solid electrolyte material to form a composite cathode. To avoid the problems arising from dendrite growth at the anode, it has been proposed to use an intercalation material as the anode material too, and this also may be mixed with solid electrolyte material to form a composite anode.

An alternative type of polymer electrolyte has recently been proposed by Gozdz et al (U.S. Pat. No. 5,296,318), which comprises a copolymer of 75 to 92% vinylidene fluoride and 8 to 25% hexafluoropropylene, blended with a lithium salt and a compatible solvent such as ethylene carbonate/propylene carbonate mixture. This composition can be cast from a suitable solvent, to provide a stable film with conductivity in the range $10^{-4}$ to $10^{-3}$ S cm$^{-1}$. Gozdz et al reported that they had tried to make such electrolyte films using PVdF homopolymers, but that the solutions, once made, gelled to an unworkable state after standing for a short time at room temperature, rendering these materials unsuitable for practical electrolyte use. Before solidification a portion of the solution was cast and dried to give a film about 0.1 mm thick. The resulting film exhibited a pronounced bloom or whitening as a result of crystalline formation; it had low physical strength and split under moderate handling; and the electrical conductivity (about $10^{-5}$ S cm$^{-1}$) was well below the range of practical utility. The present inventors have confirmed that such electrolyte films made with the PVdF homopolymers usually used are brittle and unsuitable for use as practical electrolytes.

According to the present invention there is provided a cell electrolyte material comprising polyvinylidene fluoride (PVdF) combined with a solution of a salt in a compatible solvent, wherein the PVdF is a homopolymer of sufficiently high molecular weight that its melt flow index at 230° C. and 10 kg is less than 1.0 g/10 min.

The melt flow index is a parameter commonly used to characterise polymers, and can be measured by the method specified in standard ASTM D 1238.

Surprisingly it has been found that use of PVdF homopolymer with such a low melt flow index provides good quality electrolyte material, which is clear, and tough enough to withstand handling, and can have sufficient conductivity for use in a cell at room temperature. It will be appreciated that the electrical properties of such an electrolyte material depend also on the selection of the salt and the compatible solvent.

The electrolyte material may be used in a lithium cell, for example a lithium ion cell where both the anode and cathode incorporate appropriate insertion materials. In such a lithium ion cell both the anode and the cathode may also incorporate an electrolyte material (so forming a composite electrode), and the electrolyte material of the invention may be used in one or both electrodes. Alternatively the electrolyte material of the invention may be used in some layers of such a cell while a different electrolyte material is used in other layers.

If the cell is a lithium cell (or a lithium ion cell) then the salt will be a lithium salt, such as lithium perchlorate $LiClO_4$. Other suitable salts are $LiAsF_6$, $LiPF_6$, $LiBF_4$, $LiN(SO_2CF_3)_2$, or $LiCF_3SO_3$. A variety of compatible solvents may be used, in particular ethylene carbonate or propylene carbonate; alternative solvents are dimethylcarbonate, diethoxyethane, diethyl carbonate, or dimethoxyethane. Plasticisers such as tetraethylene glycol dimethyl ether (tetraglyme), or N-methyl-pyrrolidone (1-methyl-2-pyrrolidone) may also be provided, to ensure that the solvent does not crystallize at the desired operating temperature and so to ensure adequate electrical conductivity.

The invention will now be further and more particularly described, by way of example only, and with reference to the accompanying drawings in which:

ELECTROLYTE PREPARATION 8.75 g N-methyl-pyrrolidone (NMP) and 8.75 g ethylene carbonate (EC) were mixed with 26.0 g tetrahydrofuran (THF). Then 2.0 g $LiClO_4$ was dissolved in this mixture. Then 5.0 g PVdF was added while stirring, and the mixture was warmed to fully dissolve the polymer.

The PVdF was of the type Solef 1015 (Solef is a trade mark of Solvay Chemicals Ltd) which has a melt flow index at 230° C. of 0.7 g/10 min at 10 kg, and 0.2 g/10 min at 5 kg.

The mixture was then coated onto release paper at a web speed of 1 m/min, using a doctor blade over a roller with a blade gap of 0.5 mm, and dried in the presence of an air stream while passing through successive drying zones at 50° C., 55° C. and 60° C., to evaporate all the THF.

Figure 1:
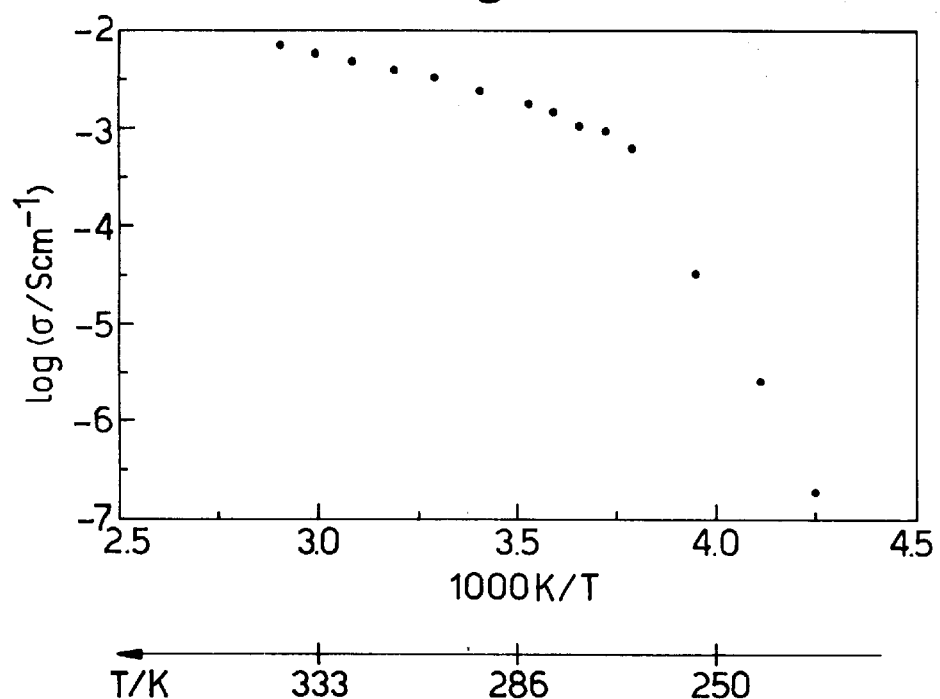
FIG. 1 shows graphically the variation of electrical conductivity of an electrolyte material with temperature.

Referring to FIG. 1 there is shown graphically the measured values of the electrical conductivity ($\sigma$) (which is ionic conductivity) of this electrolyte film at a range of different temperatures (T). It will be observed that at a temperature of 13° C. (286K) the conductivity $\sigma$ is about $1.8 \times 10^{-3}$ S cm$^{-1}$.

GRAFTED POLYMER PREPARATION

For some purposes the adhesion between the PVdF-based electrolyte material and a metal component such as a current collector is not sufficient. The adhesion can be improved by grafting monomers onto the polymer chain, the monomer being a mono-unsaturated sulphonic acid, phosphonic acid, carboxylic acid, ester, or amide; generally smaller monomers, with less than five carbon atoms in the carbon chain R-, are preferable. For example acrylic acid, various isomers of butenoic acid, or isomers of pentenoic acid may be used. The degree of grafting is desirably between 2 and 20% of the final weight, more preferably between 3 and 12%, for example 5% or 10%. The grafting can be achieved by an irradiation process or a pre-irradiation process.

PVdF powder (Solef 1015) was irradiated by a cobalt-60 gamma source for a total dose of 15 kgray, at a dose rate of 1 kgray hour$^{-1}$. The irradiated PVdF powder was then placed in a reaction vessel containing a de-oxygenated aqueous solution of acrylic acid (25% by weight) also containing ferrous sulphate (0.02M) as a homopolymerisation inhibitor. This reaction mixture was held at 80° C. and the progress of the reaction with the acrylic acid was monitored at intervals by taking a sample of the mixture and determining the remaining concentration of the acid by titration with sodium hydroxide.

After a few hours, when the desired consumption of acrylic acid had been achieved, the resulting graft copolymer powder was washed several times with deionized water, and then dried in a vacuum oven for 24 hours at 50° C. The weight of the powder was found to have increased, the increase being equal to 10% of the final weight, as a consequence of the grafting of acrylic acid into the PVdF chain.

Lithium Ion Cell Construction

A lithium ion cell was made with a composite cathode containing lithium nickel oxide as an insertion material, a composite anode containing graphite as an insertion material, and a layer of electrolyte sandwiched between the anode and the cathode. Ungrafted electrolyte material was used in the cathode and in the electrolyte layer. In the anode the electrolyte material used was based on PVdF 1015 onto which acrylic acid had been grafted by the pre-irradiation process described above.

The cathode comprises an aluminium foil current collector which is firstly coated with a dag (Acheson Electrodag 109B; trade mark) carbon layer. A composite cathode mixture comprising $Li_xNiO_2$, carbon black, and a mixture of ungrafted 1015 PVdF, EC and $LiClO_4$, is cast onto the carbon-coated aluminium foil using dimethyl acetamide (DMA) and acetone as solvents (instead of THF). An electrolyte layer comprising ungrafted 1015 PVdF, EC, NMP, and $LiClO_4$ is then cast onto the composite cathode, using THF as the volatile solvent.

The anode comprises a copper foil current collector, onto which is cast a composite anode mixture comprising graphite mixed with acrylic acid grafted 1015 PVdF, EC, NMP and $LiClO_4$, using acetone as the volatile solvent. A layer of electrolyte comprising ungrafted PVdF, EC, NMP and $LiClO_4$ is then cast onto the composite anode, using THF as the volatile solvent. This is then assembled with the cathode and electrolyte layer described above and held together under pressure at 100° C. so the two electrolyte layers bond together.

Cell Cycling

Figure 2:
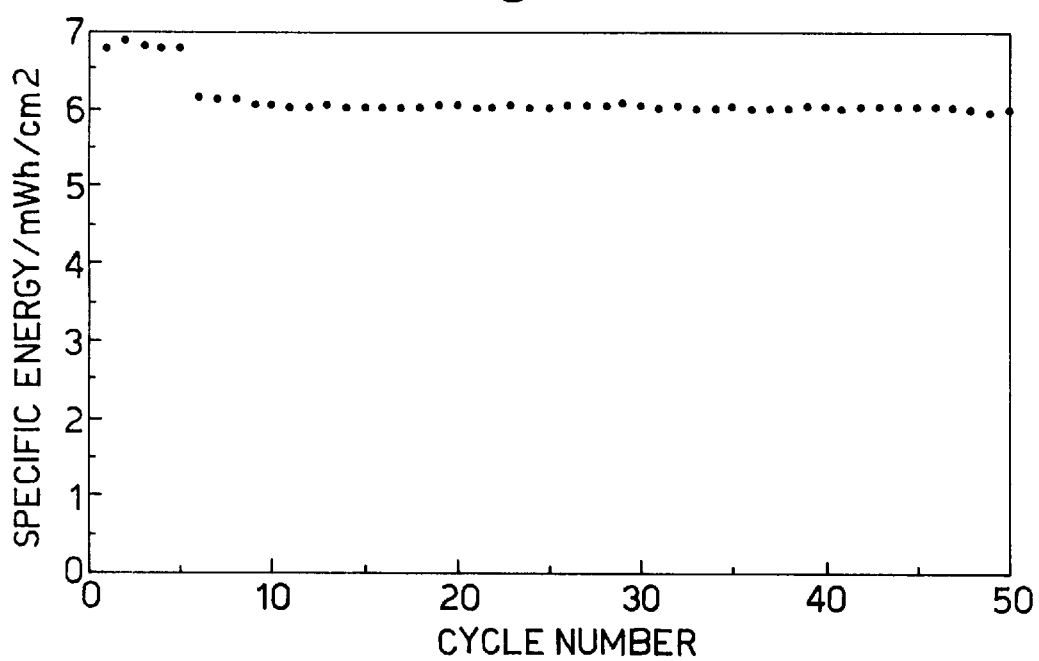
FIG. 2 shows graphically the cycling performance of a lithium ion cell incorporating the electrolyte material.

The cell made as described above was repeatedly discharged and recharged, between voltage limits of 4.0 V and 3.0 V. The first five cycles were at a current of 17 mA and enabled the cell capacity to be determined; the subsequent cycles were at the C/5 rate which is a slightly higher current. As shown in FIG. 2, which shows graphically the variation of the specific energy with cycle number, there is very little change over 50 cycles. Such a cell has been cycled as many as 500 times, and still provides a specific energy of over 3 $mWh/cm^2$.

It will be appreciated that, whether using grafted or ungrafted PVdF grade 1015, a wide variety of different compositions lead to production of satisfactory electrolyte or composite electrode layers. Four alternative compositions are as follows:

A. Composite Electrode 3.0 PVdF was dispersed in a small volume of methanol to which 14.5 g N-methyl pyrrolidone (NMP) and 20 $cm^3$ dimethyl acetamide (DMA) were added to dissolve the PVdF. 1.2 g $LiClO_4$, 9.2 g ethylene carbonate, 12.0 g graphite, 25 $cm^3$ acetone and a further 5.0 g NMP were added to the PVdF solution, and the mixture stirred and heated. The resulting slurry was cast onto a copper foil current collector and dried to evaporate the methanol, acetone and DMA. This produced satisfactory composite electrodes using PVdF-g-acrylic acid and using PVdF ungrafted (type 1015 in each case).

B. Composite Electrode

A slurry was made of 24.0 g of graphite powder, 6.0 g PVdF, 12.0 g ethylene carbonate, 6.0 g propylene carbonate and 3.91 g lithium imide ($LiN(CF_3SO_2)_2$, in 78.0 g dimethyl acetamide (DMA). The slurry was subjected to low shear and high shear mixing to ensure homogeneity, and then allowed to cool to room temperature. The slurry was then coated onto copper foil at 1 m/min using a 0.5 mm blade gap, and the casting solvent DMA evaporated by passage through successive drying zones at temperatures of 110°, 112° and 130° C.

This produced satisfactory composite electrodes using PVdF-g-acrylic acid and using PVdF ungrafted (type 1015 in each case). However, the electrode made using the grafted PVdF adhered more firmly to the copper current collector.

C. Composite Electrode

Another alternative composition of a composite anode consists of 6 g PVdF, 24 g graphite, 30 g ethylene carbonate/ diethyl carbonate (EC/DEC) mixture containing a 1M concentration of $LiPF_6$, and 9 g propylene carbonate (PC), and may be cast using 20 ml acetone and 50 g DMA as volatile solvents.

D. Electrolyte

An alternative electrolyte composition consists of 5 g PVdF, 20 g of a 1M solution of $LiPF_6$ in EC/DEC, and 4.5 g PC. This can be cast using 9 g DMA and 15 g THF as the volatile solvents.

It will be noticed from the above examples that the ratio of the weight of the liquids (solvent for the salt plus plasticiser) in the composite electrode or electrolyte, and the weight of the PVdF, varies between about 3 and 10. This ratio is preferably not less than 1, or the electrical conductivity becomes rather too low. The ratio is preferably no more than about 10 or 20, or a coherent film will not be formed; however where other solids are present, such as in a composite anode, a larger ratio is possible than in an electrolyte layer, as some of the liquid becomes associated with the solid.

We claim:

1. A cell electrolyte material comprising polyvinylidene fluoride (PVdF) combined with a solution of a salt in a compatible solvent, wherein the PVdF is a homopolymer of sufficiently high molecular weight that its melt flow index at 230° C. and 10 kg is less than 1.0 g/10 min.

2. A cell electrolyte material as claimed in claim 1 wherein the salt is a lithium salt.

3. A cell electrolyte material as claimed in claim 2 wherein the lithium salt is selected from the group consisting of $LiClO_4$, $LiAsF_6$, $LiPF_6$, $LiBF_4$, $LiN(SO_2CF_3)_2$, and $LiCF_3SO_3$.

4. A cell electrolyte material as claimed in claim 1 wherein the compatible solvent is selected from ethylene carbonate, dimethyl carbonate, diethoxyethane, diethyl carbonate and dimethoxyethane, and mixtures thereof.

5. A cell electrolyte material as claimed in claim 1 also including a plasticiser.

6. A cell electrolyte material as claimed in claim 5 wherein the plasticiser is selected from the group consisting of tetraethylene glycol dimethyl ether, N-methyl pyrrolidone, propylene carbonate, and mixtures thereof.

7. A cell electrolyte material as claimed in claim 1 wherein the ratio of the sum of the weights of the compatible solvent and any plasticiser, if present, to the weight of the PVdF is between 1 and 20.

8. A cell electrolyte material as claimed in claim 7 wherein the ratio of the sum of the weights of the compatible solvent and any said plasticiser, is between 3 and 10.

9. An electric cell containing a cell electrolyte material as claimed in claim 1.

10. An electric cell containing a cell electrolyte material comprising polyvinylidene fluoride (PVdF) combined with a solution of a salt in a compatible solvent, wherein the PVdF is a homopolymer of sufficiently high molecular weight that its melt flow index at 230° C. and 10 kg is less than 1.0 g/10 min, the salt being a lithium salt, the compatible solvent being selected from ethylene carbonate, dimethyl carbonate, diethoxyethane, diethyl carbonate and dimethoxyethane, and mixtures thereof, the material also including a plasticiser, and wherein the ratio of the sum of the weights of the compatible solvent and the plasticiser to the weight of the PVdF is between 3 and 10.

11. A method of making a layer of cell electrolyte material using polyvinylidene fluoride (PVdF), salt and a compatible solvent for said salt; said method comprising the steps of dissolving the PVdF, salt and compatible solvent in a volatile solvent to form a mixture, casting said mixture to form a thin layer and evaporating the volatile solvent, wherein the PVdF is a homopolymer of sufficiently high molecular weight that its melt flow index at 230° C. and 10 kg is less than 1.0 g/10 min.

* * * * *